(12) United States Patent
Krull et al.

(10) Patent No.: US 6,384,170 B1
(45) Date of Patent: May 7, 2002

(54) HYDROXYL-CONTAINING ETHYLENE COPOLYMERS AND FUEL OILS HAVING AN IMPROVED LUBRICATING ACTION

(75) Inventors: Matthias Krull, Oberhausen; Markus Kupetz, Dinslaken; Raimund Wildfang, Oberhausen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/213,648

(22) Filed: Dec. 16, 1998

(30) Foreign Application Priority Data

Dec. 24, 1997 (DE) .......................... 197 57 830

(51) Int. Cl.$^7$ .............................. C08F 210/00
(52) U.S. Cl. .................... 526/348; 44/271; 526/318.44; 526/318.45; 526/320; 526/324; 526/331; 526/332
(58) Field of Search .................. 526/320, 324, 526/331, 332, 348, 318.44, 318.45; 44/271

(56) References Cited

U.S. PATENT DOCUMENTS

| | | | |
|---|---|---|---|
| 3,284,415 A | | 11/1966 | Horvath |
| 3,494,897 A | | 2/1970 | Reding et al. |
| 3,841,850 A | * | 10/1974 | Aaron et al. .................... 44/62 |
| 3,915,668 A | | 10/1975 | Basalay et al. |
| 4,155,719 A | | 5/1979 | Sweeney |
| 4,211,534 A | | 7/1980 | Feldman |
| 4,670,516 A | | 6/1987 | Sackmann et al. |
| 4,726,811 A | | 2/1988 | Miller |
| 4,778,866 A | * | 10/1988 | Shimada et al. ............ 526/245 |
| 4,985,048 A | | 1/1991 | Wirtz et al. |
| 4,997,879 A | | 3/1991 | Weissgerber et al. |
| 5,186,720 A | | 2/1993 | Feustel et al. |
| 5,391,632 A | | 2/1995 | Krull et al. |
| 5,548,019 A | | 8/1996 | Kawakami et al. |
| 5,599,358 A | | 2/1997 | Giavazzi et al. |

FOREIGN PATENT DOCUMENTS

| | | |
|---|---|---|
| DE | 1594417 | 5/1970 |
| DE | 126090 | 6/1977 |
| DE | 19624861 | 1/1998 |
| EP | 0074208 | 3/1983 |
| EP | 0108240 | 5/1984 |
| EP | 0153176 | 8/1985 |
| EP | 0154177 | 9/1985 |
| EP | 0209299 | 1/1987 |
| EP | 0216210 | 4/1987 |
| EP | 0220611 | 5/1987 |
| EP | 0271738 | 6/1988 |
| EP | 0320766 | 6/1989 |
| EP | 0413279 | 2/1991 |
| EP | 0538033 | 4/1993 |
| EP | 0606055 | 7/1994 |
| EP | 0635558 | 1/1995 |
| EP | 0739970 | 10/1996 |
| EP | 0810247 | 12/1997 |
| EP | 0866079 | 9/1998 |
| WO | WO 94/17160 | 8/1994 |
| WO | WO 95/33805 | 12/1995 |
| WO | WO 96/21709 | 7/1996 |
| WO | WO 97/42236 | 11/1997 |

OTHER PUBLICATIONS

Derwent Abstract EP 680506 (See G Above).
Derwent Abstract EP 764198 (See H Above).
"Comb–like Polymer–Structures and Properties," N.A. Plate and V.P. Shibaev, J. Poly. Sci. MACROM. Revs. 1974, 8, 117 ff.
Chemical Abstracts, vol. 64 3267f.
"The Lubricity of Diesel Fuels," D. Hei. Spikes, Wear, vol. III, No. 2, p. 217,1986.
Derwent Abstract EP 802961 ( See I Above).
Ullmanns Encyclopadie der Techn. Chemie, 4, Auflage, Rd. 19, pp. 169–178.
PCT Search Report.
Derwent Patent Family Report and/or Abstracts.

* cited by examiner

Primary Examiner—Helen L. Pezzuto
(74) Attorney, Agent, or Firm—Susan S. Jackson; Scott E. Hanf

(57) ABSTRACT

The invention relates to copolymers of ethylene and at least one further olefinically unsaturated comonomer containing one or more hydroxyl groups. The invention furthermore relates to fuel oils comprising middle distillates containing a maximum of 0.5% by weight of sulfur and at least one copolymer of ethylene and at least one further olefinically unsaturated comonomer containing one or more hydroxyl groups.

44 Claims, No Drawings

HYDROXYL-CONTAINING ETHYLENE COPOLYMERS AND FUEL OILS HAVING AN IMPROVED LUBRICATING ACTION

FIELD OF THE INVENTION

The present invention relates to oil-soluble copolymers of ethylene and further comonomers which contain one or more hydroxyl groups, and their use for improving the lubricity of fuel oils.

BACKGROUND OF THE INVENTION

Mineral oils and mineral oil distillates used as fuel oils generally contain 0.5% by weight or more of sulfur, which, on burning, causes the formation of sulfur dioxide. In order to reduce the resultant environmental pollution, the sulfur content of fuel oils is continually being reduced further. The EN 590 standard relating to diesel fuels currently prescribes a maximum sulfur content of 500 ppm in Germany. In Scandinavia, fuel oils containing less than 200 ppm and in exceptional cases less than 50 ppm of sulfur are already in use. These fuel oils are generally produced by hydrotreating the fractions obtained from the crude oil by distillation. However, the desulfurization also removes other substances which provide the fuel oils with a natural lubricating action. These substances include, inter alia, polyaromatic and polar compounds.

However, it has now been found that the friction- and wear-reducing properties of fuel oils worsen with increasing degree of desulfurization. These properties are frequently so poor that the fuel-lubricated materials, such as, for example, the distributor injection pumps of diesel engines, can be expected to exhibit signs of wear after only a short time. The further lowering of the 95% distillation point to below 370° C., in some cases to below 350° C. or 330° C., which has in the meantime been carried out in Scandinavia, further exacerbates this problem.

The prior art therefore describes attempts to solve this problem (so-called lubricity additives).

EP-A-0 680 506 discloses esters of carboxylic acids having 2 to 50 carbon atoms as additives for improving the lubricating action of low-sulfur middle distillates containing less than 0.5% by weight of S.

DD-126 090 discloses lubricity additives comprising copolymers of ethylene and unsaturated carboxylic esters, preferably vinyl acetate, which are added to the fuels in amounts of from 0.01 to 0.5% by weight.

EP-A-0 764 198 discloses additives which improve the lubricating action of fuel oils and comprise polar nitrogen compounds based on alkylamines or alkyl ammonium salts containing alkyl radicals having 8 to 40 carbon atoms.

DE-A-15 94 417 discloses additives for improving the lubricating action of oleophilic liquids which comprise esters made from glycols and dicarboxylic acids having at least 11 carbon atoms.

EP-A-0 635 558 discloses diesel oils having sulfur contents of less than 0.2% by weight and aromatic contents of less than 30% by weight. These diesel oils contain, as additives, from 100 to 10,000 ppm of $C_1$–$C_5$-alkyl esters of unsaturated, straight-chain $C_{12}$–$C_{22}$-fatty acids originating from oil seed.

EP-A-0 074 208 discloses middle and heavy distillates containing, as additives, copolymers of ethylene and alkoxylated acrylates or ethylene and vinyl esters of saturated and unsaturated carboxylic acids.

The object of the present invention was to find additives which improve the lubricating action in middle distillates which have been substantially freed from sulfur and aromatic compounds. At the same time, these additives should also have a positive effect on the cold-flow properties of these middle distillates.

SUMMARY OF THE INVENTION

Surprisingly, it has been found that copolymers of ethylene and ethylenically unsaturated compounds carrying one or more hydroxyl groups provide the fuel oils to which they are added with the requisite properties.

The invention relates to copolymers of ethylene and at least one further olefinically unsaturated comonomer containing one or more hydroxyl groups.

The invention furthermore relates to fuel oils comprising middle distillates containing a maximum of 0.5% by weight of sulfur and at least one copolymer of ethylene and at least one further olefinically unsaturated comonomer containing one or more hydroxyl groups.

The olefinically unsaturated compounds which make up the further comonomer(s) are preferably vinyl esters, acrylates, methacrylates, alkyl vinyl ethers and/or alkenes carrying hydroxyalkyl, hydroxyalkenyl, hydroxycycloalkyl or hydroxyaryl radicals. These radicals contain at least one hydroxyl group, which can be in any desired position of the radical, but is preferably at the chain end (ω-position).

The vinyl esters are preferably those of the formula 1

$$CH_2=CH\text{—}OCOR^1 \qquad (1)$$

in which $R^1$ is $C_1$–$C_{30}$-hydroxyalkyl, preferably $C_1$–$C_2$-hydroxyalkyl, especially $C_2$–$C_6$-hydroxyalkyl or the corresponding hydroxy oxalkyl. Suitable vinyl esters include 2-hydroxyethylvinyl esters, α-hydroxypropylvinyl esters, 3-hydroxypropylvinyl esters and 4-hydroxybutylvinyl esters.

The acrylates are preferably those of the formula 2

$$CH_2=CR^2\text{—}COOR^3 \qquad (2)$$

in which $R^2$ is hydrogen or methyl, and $R^3$ is $C_1$–$C_{30}$-hydroxyalkyl, preferably $C_1$–$C_{12}$-hydroxyalkyl, especially $C_2$–$C_6$-hydroxyalkyl or the corresponding hydroxy oxalkyl. Suitable acrylates include hydroxyethyl acrylate, hydroxyethyl methacrylate, 2-hydroxypropyl acrylate, 3-hydroxypropyl acrylate, 3-hydroxypropyl methacrylate, hydroxyisopropyl acrylate, 4-hydroxybutyl acrylate and glycerol monoacrylate.

The alkyl vinyl ethers are preferably compounds of the formula 3

$$CH_2=CH\text{—}OR^4 \qquad (3)$$

in which $R^4$ is $C_1$–$C_{30}$-hydroxyalkyl, preferably $C_1$–$C_{12}$-hydroxyalkyl, especially $C_2$–$C_6$-hydroxyalkyl or the corresponding hydroxy oxalkyl. Suitable alkyl vinyl ethers include 2-hydroxyethyl vinyl ether, hydroxypropyl vinyl ether, hexanediol monovinyl ether, 4-hydroxybutyl vinyl ether, diethylene glycol monovinyl ether and cyclohexanedimethanol monovinyl ether.

The alkenes are preferably monounsaturated hydroxyhydrocarbons having 3 to 30 carbon atoms, in particular 4 to 16 carbon atoms, especially 5 to 12 carbon atoms. Suitable alkenes include dimethylvinylcarbinol (=2-methyl-3-buten-2-ol), allyloxypropanediol, 2-butene-1,4-diol, 1-buten-3-ol, 3-buten-1-ol, 2-buten-1-ol, 1-penten-3-ol, 1-penten-4-ol, 2-methyl-3-buten-1-ol, 1-hexen-3-ol, 5-hexen-1-ol and 7-octene-1,2-diol. In a further preferred embodiment the carbon chains of the alkenes contain oxygen atoms.

The invention furthermore relates to a process for improving the lubricating action of mineral oils and mineral oil distillates by adding the hydroxyl-containing copolymers designated in greater detail herein to the oils.

The molar proportion of hydroxy-functionalized comonomers in the copolymer is preferably from 0.5 to 15%, in particular from 1 to 12%. The OH number of the copolymers is preferably between 1 and 800 mg of KOH/g of polymer, in particular between 5 and 500 mg of KOH/g of polymer, especially between 10 and 300 mg of KOH/g of polymer.

The melt viscosities of the copolymers according to the invention at 140° C. are preferably less than 10,000 mpas, in particular between 10 and 1000 mpas, especially between 15 and 500 mPas.

Besides ethylene, the copolymers according to the invention contain at least one comonomer containing hydroxyl groups. They may also contain further, for example one, two or three further, olefinically unsaturated comonomers. Examples of such olefinically unsaturated comonomers are vinyl esters, acrylic acid, methacrylic acid, acrylic esters, methacrylic esters, vinyl ethers and olefins. Particularly preferred vinyl esters are vinyl acetate, vinyl propionate and vinyl esters of neocarboxylic acids having 8, 9, 10, 11 or 12 carbon atoms. Particularly preferred acrylic and methacrylic esters are those with alcohols having 1 to 20 carbon atoms, in particular of methanol, ethanol, propanol, n-butanol, isobutanol and tert-butanol. Particularly preferred olefins are those having 3 to 10 carbon atoms, especially propene, isobutylene, diisobutylene, norbornene, 4-methyl-1-pentene and hexene. Particular preference is given to terpolymers of ethylene, a hydroxy-functionalized comonomer and either vinyl acetate or a vinyl ester of a neocarboxylic acid having 8 to 12 carbon atoms. If the copolymers contain a further comonomer, the molar proportion thereof is preferably up to 15%, in particular up to 12%.

The comonomers are copolymerized by known processes (cf. in this respect, for example, Ullmanns Encyclopädie der Technischen Chemie [Ullmann's Encyclopedia of Industrial Chemistry], 4th Edition, Vol. 19, pages 169 to 178). Suitable processes are polymerization in solution, in suspension or in the gas phase and high-pressure bulk polymerization. Preference is given to high-pressure bulk polymerization, which is carried out at pressures of from 50 to 400 MPa, preferably from 100 to 300 MPa, and at temperatures of from 50 to 350° C., preferably from 100 to 300° C. The reaction of the comonomers is started by initiators which form free radicals (free-radical chain initiators). This class of substances includes, for example, oxygen, hydroperoxides, peroxides and azo compounds, such as cumene hydroperoxide, t-butyl hydroperoxide, dilauroyl peroxide, dibenzoyl peroxide, bis (2-ethylhexyl) peroxydicarbonate, t-butyl permaleate, t-butyl perbenzoate, dicumyl peroxide, t-butyl cumyl peroxide, di(t-butyl) peroxide, 2,2'-azobis(2-methylpropanonitrile) and 2,2'-azobis(2-methylbutyronitrile). The initiators are employed individually or as a mixture of two or more substances in amounts of from 0.01 to 20% by weight, preferably from 0.05 to 10% by weight, based on the comonomer mixture.

The desired melt viscosity of the copolymers is set for a given composition of the comonomer mixture by varying the reaction parameters pressure and temperature and if desired by adding moderators. Moderators which have proven successful are hydrogen, saturated and unsaturated hydrocarbons, for example propane, aldehydes, for example propionaldehyde, n-butyraldehyde and isobutyraldehyde, ketones, for example acetone, methyl ethyl ketone, methyl isobutyl ketone and cyclohexanone, and alcohols, for example butanol. Depending on the desired viscosity, the moderators are used in amounts of up to 20% by weight, preferably from 0.05 to 10% by weight, based on the comonomer mixture.

High-pressure bulk polymerization is carried out batchwise or continuously in known high-pressure reactors, for example autoclaves or tubular reactors. Tubular reactors have proven particularly successful. Solvents, such as aliphatic hydrocarbons or hydrocarbon mixtures, benzene or toluene, can be present in the reaction mixture, although the solvent-free procedure has proven particularly successful. In a preferred way of carrying out the polymerization, the mixture of the comonomers, the initiator and, if used, the moderator is fed to a tubular reactor via the reactor inlet and via one or more side branches; the comonomer streams can have different compositions (EP-B-0 271 738).

The novel improvement in the lubricating action of oils can likewise be effected by copolymers containing structural units derived from ethylene and vinyl alcohol. Copolymers of this type can be prepared by partially or fully hydrolyzing a copolymer containing structural units derived from ethylene and vinyl acetate.

Likewise, copolymers derived from ethylene and monomers carrying glycidyl radicals, such as, for example, glycidyl (meth)acrylate or glycidyl allyl ether, can also be used in accordance with the invention after hydrolysis using water, alcohols, such as methanol or glycol, or amines, such as, for example, ammonia, methylamine, ethanolamine and diethanolamine.

The lubricating action of oils can furthermore be improved in the manner according to the invention by admixing them with ethylene copolymers containing alkoxylated acid groups. Examples of ethylene copolymers which are suitable for this purpose are those containing acrylic acid, methacrylic acid, itaconic acid, fumaric acid, maleic acid or maleic anhydride. In order to prepare an additive which improves the lubricating action of oils, these copolymers containing acid groups are alkoxylated on the acid groups using $C_1$- to $C_{10}$-alkylene oxides. Preferred alkylene oxides are ethylene oxide, propylene oxide and butylene oxides. The alkoxylation is preferably carried out using from 0.5 to 10 mol, in particular from 1 to 5 mol, especially from 1 to 2 mol, of alkylene oxide per mole of acid groups.

The copolymers according to the invention are added to mineral oils or mineral oil distillates in the form of solutions or dispersions comprising from 10 to 90% by weight, preferably from 20 to 80%, of the polymers. Suitable solvents or dispersion media are aliphatic and/or aromatic hydrocarbons or hydrocarbon mixtures, for example gasoline fractions, kerosene, decane, pentadecane, toluene, xylene, ethylbenzene or commercial solvent mixtures, such as solvent naphtha, ®Shellsol AB, ®Solvesso 150, ®Solvesso 200, ®Exxsol-, ®ISOPAR and Shellsol D products. Mineral oils and mineral oil distillates whose lubricating and/or cold-flow properties have been improved by the copolymers contain from 0.001 to 2% by weight, preferably from 0.005 to 0.5% by weight, of copolymer, based on the distillate.

The copolymers according to the invention may furthermore be used in the form of mixtures consisting of copolymers of the type claimed, but of different qualitative and/or quantitative composition and/or of different viscosity (measured at 140° C.). The mixing ratio (in parts by weight) of the copolymers can be varied over a broad range and can be, for example from 20:1 to 1:20, preferably from 10:1 to 1:10. In this way, the additives can be matched specifically to individual requirements.

In order to prepare additive packages for specific problem solutions, the copolymers according to the invention can also be employed together with one or more oil-soluble co-additives. Examples of such co-additives are polar compounds which effect paraffin dispersal (paraffin dispersants), comb polymers and oil-soluble amphiphilic compounds.

For use as flow improvers and/or lubricity additives, the copolymers according to the invention can furthermore be employed in the form of a mixture with paraffin dispersants. These additives reduce the size of the paraffin crystals and prevent the paraffin particles from settling out, but instead ensure that they remain colloidally dispersed with significantly reduced sedimentation effort. Furthermore, they reinforce the lubricating action of the copolymers according to the invention. Paraffin dispersants which have proven successful are oil-soluble polar compounds containing ionic or polar groups, for example amine salts and/or amides, which are obtained by reacting aliphatic or aromatic amines, preferably long-chain aliphatic amines, with aliphatic or aromatic mono-, di-, tri- or tetracarboxylic acids or anhydrides thereof (cf. U.S. Pat. No. 4,211,534). Other paraffin dispersants are copolymers of maleic anhydride and $\alpha,\beta$-unsaturated compounds, which, if desired, can be reacted with primary monoalkylamines and/or aliphatic alcohols (cf. EP 0 154 177), the products of the reaction of alkenylspirobislactones with amines (cf. EP 0 413 279 B1) and, according to EP 0 606 055 A2, products of the reaction of terpolymers based on $\alpha,\beta$-unsaturated dicarboxylic anhydrides, $\alpha,\beta$-unsaturated compounds and polyoxyalkylene ethers of lower unsaturated alcohols. Alkylphenol-aldehyde resins are also suitable as paraffin dispersants.

Finally, in a further proven variant of the invention, the copolymers according to the invention can be used together with comb polymers. This is taken to mean polymers in which hydrocarbon radicals having at least 8 carbon atoms, in particular at least 10 carbon atoms, are bonded to a polymer backbone. These are preferably homopolymers whose alkyl side chains contain at least 8 and in particular at least 10 carbon atoms. In the case of copolymers, at least 20%, preferably at least 30%, of the monomers have side chains (cf. Comb-like Polymers—Structure and Properties; N. A. Platé and V. P. Shibaev, J. Polym. Sci. Macromolecular Revs. 1974, 8, 117 ff). Examples of suitable comb polymers are, for example, fumarate-vinyl acetate copolymers (cf. EP 0 153 176 Al), copolymers of a $C_6$- to $C_{24}$-α-olefin and an N—$C_6$- to $C_{22}$-alkylmaleimide (cf. EP 0 320 766), furthermore esterified olefin-maleic anhydride copolymers, polymers and copolymers of α-olefins and esterified copolymers of styrene and maleic anhydride.

Comb polymers can be described, for example, by the formula

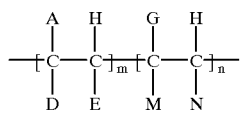

in which

A is R', COOR', OCOR', R"—COOR' or OR';

D is H, $CH_3$, A or R";

E is H or A;

G is H, R", R"—COOR', an aryl radical or a heterocyclic radical;

M is H, COOR", OCOR", OR" or COOH;

N is H, R", COOR", OCOR, COOH or an aryl radical;

R' is a hydrocarbon chain having 8–50 carbon atoms;

R" is a hydrocarbon chain having 1 to 10 carbon atoms;

m is a number between 0.4 and 1.0; and n is a number between 0 and 0.6.

The mixing (in parts by weight) of the terpolymers prepared in accordance with the invention with paraffin dispersants or comb polymers is in each case from 1:10 to 20:1, preferably from 1:1 to 10:1.

In order to optimize the lubricating action, the copolymers according to the invention can be employed in the form of a mixture with further lubricity additives. Lubricity additives which have proven successful are preferably oil-soluble amphiphilic compounds, such as, for example, fatty alcohols, fatty acids and dimeric fatty acids, and esters and partial esters thereof with glycols (as described in DE-A-15 94 417), polyols, such as glycerol (as described in EP-A-0 680 506, EP-A-0 739 970) or hydroxylamines (as described in EP-A-0 764 198).

The additives according to the invention are suitable for improving the lubricating and cold-flow properties of animal, vegetable or mineral oils and of alkanol-containing fuels. In addition, they retard or prevent sedimentation of precipitated paraffin crystals. They are particularly suitable for use in middle distillates. The term middle distillates is taken to mean, in particular, mineral oils boiling in the range from 120 to 450° C., and obtained by distillation of crude oil. Examples include kerosene, jet fuel, diesel and heating oil. The copolymers according to the invention are preferably used in middle distillates containing 0.5% by weight or less of sulfur, in particular less than 200 ppm of sulfur and in special cases less than 50 ppm of sulfur. These are generally middle distillates which have been hydrotreated and therefore contain only small proportions of polyaromatic and polar compounds which give them a natural lubricating action. The copolymers according to the invention are furthermore preferably used in middle distillates having 95% distillation points of below 370° C., in particular below 350° C. and in special cases below 330° C.

The polymers can be used alone or together with other additives, for example with other pour point depressants or dewaxing auxiliaries, with corrosion inhibitors, antioxidants, detergent additives, cetane number improvers, sludge inhibitors, dehazers and additives for lowering the cloud point.

The effectiveness of the polymers according to the invention as cold-flow improvers is explained in greater detail by means of the examples below.

EXAMPLES

Preparation Procedure 1

The preparation of polymers 1 to 13 was carried out as follows: Ethylene and the comonomers are polymerized in a high-pressure autoclave with addition of propionaldehyde as molecular weight regulator (moderator). To this end, the monomer mixture, to which bis(2-ethylhexyl) peroxydicarbonate dissolved in white spirit (5% strength by weight solution) has been added as initiator, is fed into the reactor at 185° C. under a reaction pressure of 150 MPa. The residence time of the reactants in the autoclave is about 120 seconds. Tables 1a, 1b and 2 show the polymerization conditions, and Table 3 shows the properties of the terpolymers obtained.

TABLE 1a

Preparation of terpolymers in accordance with preparation procedure 1

| Polymer No. | Amount used (% by weight) C$_2$H$_4$ | Comonomer | Comonomer | Initiator (ppm by weight, based on ethylene) | Moderator (% by weight, based on monomer) | Yield [% by weight] |
|---|---|---|---|---|---|---|
| 1  | 91.6 | 8.4% HPA   | —        | 560  | 7.2  | 15 |
| 2  | 77.5 | 4.5% HPA   | 18% VA   | 375  | 5.9  | 14 |
| 3  | 75.6 | 7.4% HPA   | 17% VA   | 490  | 6.0  | 13 |
| 4  | 75.1 | 6.9% HPA   | 18% VeoVa| 675  | 6.4  | 20 |
| 5  | 90.7 | 9.3% HPMA  | —        | 1315 | 7.5  | 20 |
| 6  | 77.1 | 4.9% HPMA  | 18% VA   | 900  | 5.9  | 18 |
| 7  | 75.2 | 6.8% HPMA  | 18% VA   | 1315 | 6.0  | 20 |
| 8  | 91.2 | 8.8% HEMA  | —        | 1880 | 7.8  | 20 |
| 9  | 91.2 | 8.8% HEMA  | —        | 2255 | 10.0 | 20 |
| 10 | 77.7 | 4.6% HEMA  | 18% VA   | 1600 | 6.6  | 18 |
| 11 | 75.0 | 7.6% HEMA  | 17% VA   | 2670 | 6.3  | 20 |
| 12 | 59.0 | 13% DMVC   | 28% VA   | 1540 | 4.8  | 13 |
| 13 | 66.0 | 4% DMVC    | 30% VA   | 970  | 5.3  | 11 |

HPA = Hydroxypropyl acrylate
HPMA = Hydroxypropyl methacrylate
HEMA = Hydroxyethyl acrylate
VA = Vinyl acetate,
VeoVa = Vinyl neodecanoate
DMVA = Dimethylvinylcarbinol Examples 14–17

Polymerizations were carried out as described in preparation procedure 1 at a temperature of 220° C. in the presence of tert-butyl peroxypivalate.

TABLE 1b

Preparation of terpolymers in accordance with preparation procedure 1

| Polymer No. | Amount used (% by weight) C$_2$H$_4$ | Comonomer | Termonomer | Initiator (ppm by weight, based on ethylene) | Moderator (% by weight, based on monomer) | Yield [% by weight] |
|---|---|---|---|---|---|---|
| 14 | 80.1 | 1.9% HEMA | 18.4% VA | 375 | 6.3 | 20 |
| 15 | 67.4 | 1.6% HEMA | 31.1% VA | 330 | 6.1 | 20 |
| 16 | 56.8 | 1.2% HEMA | 42.1% VA | 470 | 5.4 | 21 |
| 17 | 66.2 | 2.8% HEMA | 31% VA   | 520 | 4.8 | 22 |

HEMA = Hydroxyethyl methacrylate
VA = Vinyl acetate

Preparation Procedure 2

Hydroxy-functional comonomer, moderator, initiator solution (di-tert-butyl peroxide in isoparaffinic solvent) and, if desired, vinyl ester are introduced into an autoclave heated to 150° C. Ethylene is then injected to a pressure of 160 MPa. As soon as the pressure has dropped to 140 MPa, further ethylene is injected. This operation is repeated six times. After a total reaction time of 120 minutes, the reaction product is discharged from the reactor.

TABLE 2

Preparation of terpolymers as described in preparation procedure 2

| Polymer | Amount used Comonomer 1 | Comonomer 2 | Initiator [g] | Moderator | Yield [g] |
|---|---|---|---|---|---|
| A | 70 g GMA  | 120 g VA | 0.5 | 30 g | 260 |
| B | 110 g AOPD | —       | 6   | 20 g | 214 |
| C | 155 g DMVC | 120 g VA | 0.75 | 15 g | 240 |

DMVC = Dimethylvinylcarbinol
GMA = Glycerol monoacrylate
AOPD = Allyloxypropanediol Characterization of the Polymers The vinyl acetate content is determined by polyrolysis of the polymer. To this end, 100 mg of the polymer are pyrolyzed for 5 minutes at 450° C. in vacuo in a closed system in a pyrolysis flask with 200 mg of pure polyethylene, and the pyrolysis gases are collected in a 250 ml round-bottom flask. The pyrolysis product acetic acid is reacted with an NaI/KIO$_3$ solution, and the iodine liberated is titrated with Na$_2$S$_2$O$_3$ solution.

The hydroxy-functional comonomers are determined by measuring the OH number by reacting the polymer with excess acetic anhydride and then titrating the acetic acid formed with KOH.

The viscosity is determined in accordance with ISO 3219 (B) using a rotational viscometer (Haake RV 20) with a plate-and-cone measurement system at 140° C.

TABLE 3

Characterization of the terpolymers

| Example No. | Vinyl ester | $V_{140}$ (mPas) | OH number |
|---|---|---|---|
| 1 | — | 138 | 145 |
| 2 | 14% VA | 133 | 113 |
| 3 | 13% VA | 200 | 132 |
| 4 | 11% VeoVa | 135 | 133 |
| 5 | — | 118 | 145 |
| 6 | 12% VA | 153 | 97 |
| 7 | 11% VA | 170 | 115 |
| 8 | — | 149 | 159 |
| 9 | — | 77 | 152 |
| 10 | 12.9% VA | 123 | 101 |
| 11 | 10.8% VA | 177 | 130 |
| 12 | 24.7% VA | 101 | 38 |
| 13 | 25.6% VA | 92 | 24 |
| 14 | 13.3% VA | 68 | 60 |
| 15 | 22.2% VA | 77 | 38 |
| 16 | 31.5% VA | 92 | 25 |
| 17 | 22.3% VA | 93 | 42 |
| A | 22.3% VA | 97 | 86 |
| B | — | 48 | 102 |
| C | 28.3% VA | 121 | 24 |

TABLE 4

Characterization of the test oils
The boiling data are determined in accordance with ASTM D-86, the CFPP value is determined in accordance with EN 116, and the cloud point is determined in accordance with ISO 3015.

| | Test oil 1 | Test oil 2 | Test oil 3 |
|---|---|---|---|
| Start of boiling [° C.] | 195 | 165 | 169 |
| 20% [° C.] | 226 | 235 | 240 |
| 30% [° C.] | 232 | 256 | 259 |
| 90% [° C.] | 281 | 354 | 359 |
| 95% [° C.] | 300 | 369 | 377 |
| Cloud point [° C.] | −30.5 | −0.5 | 0 |
| CFPP [° C.] | −31 | −3 | −2 |
| S content [ppm] | 14 | 160 | 171 |

Lubricating Action in Middle Distillates

The lubricating action of the additives was measured at 60° C. on oils containing the additives using a PCS Instruments high frequency reciprocating rig (HFRR). The HFRR test is described in D. Wei, H. Spikes, Wear, Vol.111, No. 2, p. 217, 1986. The results are given as coefficient of friction and wear scar. A low coefficient of friction and a low wear scar value indicate a good lubricating action. As comparison, a commercially available flow improver based on a copolymer of ethylene and 30% by weight of vinyl acetate and having a melt viscosity $V_{140}$ of 105 mPas is used.

TABLE 5

Wear scar in test oil 1

| Example | Additive | Friction | Av. film [%] | Wear scar [μm] |
|---|---|---|---|---|
| 1 | — | 0.62 | 19 | 620 |
| 2 | 500 ppm Polymer 1 | 0.14 | 96 | 233 |
| 3 | 250 ppm Polymer 1 | 0.25 | 47 | 470 |
| 4 | 500 ppm Polymer 2 | 0.13 | 96 | 228 |
| 5 | 500 ppm Polymer 3 | 0.13 | 93 | 260 |
| 6 | 500 ppm Polymer 4 | 0.12 | 96 | 240 |
| 7 | 250 ppm Polymer 4 | 0.18 | 75 | 343 |
| 8 | 250 ppm Polymer 5 | 0.17 | 78 | 333 |
| 9 | 250 ppm Polymer 6 | 0.17 | 83 | 308 |
| 10 | 250 ppm Polymer 7 | 0.18 | 82 | 325 |
| 11 | 250 ppm Polymer 9 | 0.16 | 88 | 258 |
| 12 | 250 ppm Polymer 10 | 0.17 | 90 | 278 |
| 13 | 250 ppm Polymer 11 | 0.18 | 89 | 263 |
| 14 | 250 ppm Polymer 12 | 0.18 | 74 | 408 |
| 15 | 250 ppm Polymer 13 | 0.16 | 84 | 275 |
| 16 | 125 ppm Polymer 14 | 0.21 | 81 | 380 |
| 17 | 250 ppm Polymer 15 | 0.17 | 92 | 260 |
| 18 | 250 ppm Polymer 16 | 0.19 | 87 | 298 |
| 19 | 200 ppm Polymer 17 | 0.15 | 91 | 268 |
| 20 | 125 ppm Polymer 17 | 0.18 | 84 | 355 |
| 21 | 250 ppm Polymer A | 0.18 | 86 | 315 |
| 22 | 500 ppm Polymer B | 0.09 | 87 | 298 |
| 23 | 250 ppm Polymer C | 0.37 | 84 | 300 |
| 24 | 500 ppm EVA copolymer (comparison) | 0.31 | 9 | 619 |

TABLE 6

CFPP effectiveness in test oil 1

| Additive | 100 ppm | 200 ppm |
|---|---|---|
| Polymer 13 | −39 | −39 |

TABLE 7

CFPP effectiveness in test oil 2

| Additive | 200 ppm | 400 ppm |
|---|---|---|
| Polymer 2 | −8 | −12 |
| Polymer 4 | −8 | −8 |
| Polymer 10 | −8 | −11 |
| Polymer 13 | −14 | −16 |

TABLE 8

CFPP synergism in test oil 3

| Additive | 50 ppm | 200 ppm |
|---|---|---|
| Polymer 2 | −9 | −11 |
| Polymer 3 | −7 | −10 |
| Polymer 4 | −8 | −11 |

List of Trade Names Used

| | |
|---|---|
| Solvent naphtha ® Shellsol AB ® Solvesso 150 | aromatic solvent mixtures having a boiling range of from 180 to 210° C. |
| ® Solvesso 200 | aromatic solvent mixture having a boiling range of from 230 to 287° C. |
| ® Exxsol | Dearomatized solvent in various boiling ranges, for example ® Exxsol D60: 187 to 215° C. |

| ® ISOPAR (Exxon) | isoparaffinic solvent mixtures in various boiling ranges, for example ® ISOPAR L: 190 to 210° C. |
| --- | --- |
| ® Shellsol D | principally aliphatic solvent mixtures in various boiling ranges |

What is claimed is:

1. A process for improving the lubricity of a middle distillate fuel oil having a sulfur content of 200 ppm at most, comprising incorporating into said fuel oil from 0.001% to 2% by weight of a copolymer of ethylene and at least one further olefinically unsaturated comonomer containing one or more hydroxyl groups.

2. The process as claimed in claim 1, wherein the olefinically unsaturated comonomer containing one or more hydroxyl groups conforms to the formula 1

$$CH_2=CH-OCOR^1 \quad (1)$$

in which $R^1$ is $C_1-C_{30}$-hydroxyalkyl.

3. The process as claimed in claim 1, wherein the olefinically unsaturated comonomer containing one or more hydroxyl groups conforms to the formula 2

$$CH_2=CR^2-COOR^3 \quad (2)$$

in which $R^2$ is hydrogen or methyl, and $R^3$ is $C_1-C_{30}$-hydroxyalkyl.

4. The process as claimed in claim 1, wherein the olefinically unsaturated comonomer conforms to the formula 3

$$CH_2=CH-OR^4 \quad (3)$$

in which $R^4$ is $C_1-C_{30}$-hydroxyalkyl,.

5. The process as claimed claim 1, wherein the olefinically unsaturated comonomer is a hydroxyalkene having 3 to 30 carbon atoms.

6. The process as claimed in claim 1, wherein the molar proportion of the hydroxyl-functionalized comonomers is from 0.5 to 15%.

7. The process as claimed in claim 1, wherein the number of OH groups per molecule is between 1 and 800.

8. The process as claimed in claim 1, wherein the melt viscosities of the copolymers are below 10,000 mPas.

9. The process as claimed in claim 1, wherein besides ethylene and hydroxy-functionalized comonomers, the copolymers contain one, two or three further comonomers selected from the group consisting of vinyl esters, acrylic acid, acrylates, vinyl ethers and alkenes.

10. The process as claimed in claim 3 in which $R^1$ of (1) is a $C_1-C_{12}$-hydroxyalkyl.

11. The process as claimed in claim 10 in which $R^1$ of (1) is a $C_2-C_6$-hydroxyalkyl.

12. The process as claimed in claim 1 wherein said comonomer is selected from the group consisting of 2-hydroxyethylvinyl ester, 2-hydroxypropylvinyl ester, 3-hydroxypropylvinyl ester and 4-hydroxybutylvinyl ester.

13. The process as claimed in claim 3 wherein $R^3$ is a $C_1-C_{12}$-hydroxyalkyl.

14. The process as claimed in claim 13 wherein $R^3$ is a $C_2-C_6$-hydroxyalkyl.

15. The process as claimed in claim 3 wherein said olefinically unsaturated comonomer is selected from the group consisting of hydroxyethyl acrylate, hydroxyethyl methacrylate, 2-hydroxypropyl acrylate, 3-hydroxypropyl acrylate, 3-hydroxypropyl methacrylate, hydroxyisopropyl acrylate, 4-hydroxybutyl acrylate, and glycerol monoacrylate.

16. The process as claimed in claim 4 in which $R^4$ of (3) is $C_1-C_{12}$-hydroxyalkyl.

17. The process as claimed in claim 16 in which $R^4$ of (3) is $C_2-C_6$-hydroxyalkyl.

18. The process as claimed in claim 4 wherein said comonomer conforming to the formula 3 is selected from the group consisting of 2-hydroxyethyl vinyl ether, hydroxypropyl vinyl ether, hexanediol monovinyl ether, 4-hydroxybutyl vinyl ether, diethylene glycol monovinyl ether and cyclohexanedimethanol monovinyl ether.

19. The process as claimed in claim 5 wherein said olefinically unsaturated comonomer is a hydroxyalkene having from 4 to 16 carbon atoms.

20. The process as claimed in claim 19 wherein said olefinically unsaturated comonomer is a hydroxyalkene having from 5 to 12 carbon atoms.

21. The process as claimed in claim 5 wherein said olefinically unsaturated comonomer is selected from the group consisting of dimethylvinylcarbinol (=2-methyl-3-buten-2-ol), allyloxypropanediol, 2-butene-1,4-diol, 1-buten-3-ol, 3-buten-1-ol, 2-buten-1-ol, 1-penten-3-ol, 1-penten-4-ol, 2-methyl-3-buten-1-ol, 1-hexen-3-ol, 5-hexen-1-ol and 7-octen-1,2-diol.

22. The process as claimed in claim 6, wherein the molar proportion of said hydroxyl-functionalized comonomer is from 1 to 12%.

23. The process as claimed 8, wherein the melt viscosities of the copolymers are from 10 to 1000 mPas.

24. A fuel oil composition having improved lubricity, comprising a middle distillate fuel oil having a sulfur content of 200 ppm at most, and 0.001 to 2% of a copolymer of ethylene and at least one further olefinically unsaturated comonomer containing one or more hydroxyl groups.

25. The fuel oil as claimed in claim 24, wherein the olefinically unsaturated comonomer containing one or more hydroxyl groups conforms to the formula 1

$$CH_2=CH-OCOR^1 \quad (1)$$

in which $R^1$ is a $C_1-C_{30}$-hydroxyalkyl.

26. The fuel oil as claimed in claim 25 in which $R^1$ of (1) is a $C_1-C_{12}$-hydroxyalkyl.

27. The fuel oil as claimed in claim 26 in which $R^1$ of (1) is $C_2-C_6$-hydroxyalkyl.

28. The fuel oil as claimed in claim 25 wherein said comonomer is selected from the group consisting of 2-hydroxyethyl vinyl ester, 2-hydroxypropyl vinyl ester, 3-hydroxypropyl vinyl ester and 4-hydroxybutyl vinyl ester.

29. The fuel oil as claimed in claim 24, wherein the olefinically unsaturated comonomer containing one or more hydroxyl groups conforms to the formula 2

$$CH_2=CR^2-COOR^3 \quad (2)$$

in which $R^3$ is a $C_1-C_{30}$-hydroxyalkyl.

30. The fuel oils as claimed in claim 29 in which $R^3$ of (2) is a $C_1-C_{12}$-hydroxyalkyl.

31. The fuel oil as claimed in claim 29 wherein said comonomer is selected from the group consisting of 2-hydroxyethylvinyl ester, 2-hydroxypropylvinyl ester, 3-hydroxypropylvinyl ester and 4-hydroxybutylvinyl ester.

32. The fuel oil as claimed in claim 24, wherein the olefinically unsaturated comonomer conforms to the formula 3

$$CH_2=CH-OR^4 \quad (3)$$

in which $R^4$ is $C_1-C_{30}$-hydroxyalkyl.

33. The fuel oil as claimed in claim 32 in which $R^4$ of (3) is $C_1$–$C_{12}$-hydroxyalkyl.

34. The fuel oil as claimed in claim 33 in which $R^4$ of (3) is $C_2$–$C_6$-hydroxyalkyl.

35. The fuel oil as claimed in claim 32 wherein said comonomer conforming to the formula 3 is selected from the group consisting of 2-hydroxyethyl vinyl ether, hydroxypropyl vinyl ether, hexanediol monovinyl ether, 4-hydroxybutyl vinyl ether, diethylene glycol monovinyl ether and cyclohexanedimethanol monovinyl ether.

36. The fuel oil as claimed claim 24, wherein the olefinically unsaturated comonomer is a hydroxyalkene having 3 to 30 carbon atoms.

37. The fuel oil as claimed in claim 36, wherein said olefinically unsaturated comonomer is a hydroxyalkene having from 4 to 16 carbon atoms.

38. The fuel oil as claimed claim 24, wherein said olefinically unsaturated comonomer is selected from the group consisting of dimethylvinylcarbinol (=2-methyl-3-buten-2-ol), allyloxypropanediol, 2-butene-1,4-diol, 1-buten-3-ol, 3-buten-1-ol, 2-buten-1-ol, 1-penten-3-ol, 1-penten-4-ol, 2-methyl-3-buten-1-ol, 1-hexen-3-ol, 5-hexen-1-ol and 7-octen-1,2-diol.

39. The fuel oil as claimed in claim 24, wherein the molar proportion of the hydroxyl-functionalized comonomers is from 0.5 to 15%.

40. The fuel oil as claimed in claim 39, wherein the molar proportion of the hydroxyl-functionalized comonomers is from 1 to 12%.

41. The fuel oil as claimed in claim 24, wherein the number of OH groups per molecule is between 1 and 800.

42. The fuel oil as claimed in claim 24, wherein the melt viscosities of the copolymers are below 10,000 mPas.

43. The fuel oil as claimed in claim 24, wherein the melt viscosities of the copolymers are from 10 to 1000 mPas.

44. The fuel oil as claimed in claim 24, wherein besides ethylene and hydroxy-functionalized comonomers, the copolymers contain one, two or three further comonomers selected from the group consisting of vinyl esters, acrylic acid, acrylates, vinyl ethers and alkenes.

* * * * *